(12) United States Patent
Yuan et al.

(10) Patent No.: US 7,949,497 B2
(45) Date of Patent: May 24, 2011

(54) MACHINE CONDITION MONITORING USING DISCONTINUITY DETECTION

(75) Inventors: Chao Yuan, Secaucus, NJ (US); Claus Neubauer, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 567 days.

(21) Appl. No.: 12/077,255

(22) Filed: Mar. 18, 2008

(65) Prior Publication Data

US 2008/0288213 A1 Nov. 20, 2008

Related U.S. Application Data

(60) Provisional application No. 60/911,335, filed on Apr. 12, 2007.

(51) Int. Cl.
*G06F 11/30* (2006.01)
(52) U.S. Cl. ........................................ 702/185; 700/108
(58) Field of Classification Search .......... 702/182–185, 702/188; 700/108, 110
See application file for complete search history.

(56) References Cited

U.S. PATENT DOCUMENTS

| 4,812,995 A * | 3/1989 | Girgis et al. ................. 700/292 |
| 5,636,134 A | 6/1997 | Johnson et al. |
| 6,480,810 B1 | 11/2002 | Cardella et al. |
| 7,474,992 B2 * | 1/2009 | Ariyur ........................... 702/190 |
| 2006/0230313 A1 | 10/2006 | Grichnik et al. |
| 2007/0192063 A1* | 8/2007 | Abu-El-Zeet et al. ........ 702/182 |

FOREIGN PATENT DOCUMENTS
EP 0 843 244 A1 5/1998

OTHER PUBLICATIONS

Dethlefsen, C., et al., "Formulating State Space Models in R with Focus on Longitudinal Regression Models", Journal of Statistical Software, 2006, p. 1-15, 16(1).

* cited by examiner

*Primary Examiner* — Manuel L Barbee

(57) ABSTRACT

Condition signals of machines are observed and one or more discontinuities are detected in the condition signals. The discontinuities in the condition signals are compensated for (e.g., by applying a shifting factor to models of the signals) and trends of the compensated condition signals are determined. The trends are used to predict future fault conditions in machines. Kalman filters comprising observation models and evolution models are used to determine the trends. Discontinuity in observed signals is detected using hypothesis testing.

17 Claims, 6 Drawing Sheets

MACHINE CONDITION MONITORING USING DISCONTINUITY DETECTION

This application claims the benefit of U.S. Provisional Application No. 60/911,335 filed Apr. 12, 2007, which is incorporated herein by reference.

BACKGROUND OF THE INVENTION

The present invention relates generally to machine condition monitoring and more particularly to trend analysis using discontinuity detection for machine condition prognosis.

Machine condition monitoring (MCM) is the process of monitoring one or more parameters of machinery, such that a significant change in the machine parameter(s) is indicative of a current or developing condition (e.g., failure, fault, etc.). Such machinery includes rotating and stationary machines, such as turbines, boilers, heat exchangers, etc. Machine parameters of monitored machines may be vibrations, temperatures, friction, electrical usage, power consumption, sound, etc., which may be monitored by appropriate sensors. The output of the sensors may be in the form of and/or be aggregated into a sensor signal or a similar signal.

Generally, a condition is a comparison of the machine parameter to a threshold. For example, a machine parameter value may be compared with an equality and/or inequality operator, such as $<, =, >, \neq, \equiv, \leq, \geq$, etc., to a threshold value. Therefore, a condition signal is a signal based on the machine parameter values (e.g., a plurality of machine parameter values grouped as a discrete or continuous signal). Since machine sensor are subject to certain amounts of uncertainty, error, noise, and the like, condition signals are composed of an actual signal as well as some amount of noise.

Machine condition monitoring systems generally use a number of rules to define the machine parameters to be monitored and critical information (e.g., indicative of a condition change) about those machine parameters. In some cases, hundreds of sensors monitor and/or record these machine parameters. The output of the sensors (e.g., sensor signal, sensor estimate, sensor residue, etc.) may then be used as the input to one or more rules. Rules are used to detect faults, but must minimize improper indicators of faults (e.g., false alarms). In general, simple rules are constructed as indicative conditional logical operations (e.g., if-then statements). The input of a rule, the "if", is a condition as described above (e.g., if machine parameter A>threshold B) and the output of the rule, the "then", is a fault (e.g., then fault type 1).

Fault prognosis in MCM is used to predict the future parameter values and/or condition signal of a machine. That is, fault prognosis attempts to determine when a fault condition or other significant machine event will occur. Preventative maintenance or other action may be taken to prevent these faults.

Presently, machine condition monitoring fault prognosis relies on trend analysis of condition signals. Current and former machine parameter values are analyzed to determine a condition trend. The condition trend is determined by determining an equation, such as a polynomial equation, approximating the trend. Based on this trend analysis, a future condition of the machine may be determined. However, such basic trend analysis fails to account for discontinuities in condition signals. That is, current trend analysis in MCM is subject to falsely predicting trends and thus mistakenly predicting failure times.

Therefore, alternative methods are required to analyze trends and detect discontinuities in machine condition monitoring.

BRIEF SUMMARY OF THE INVENTION

The present invention provides methods and apparatus for machine condition monitoring and fault detection by detecting and compensating for discontinuities in observed signals. Condition signals of machines are observed and one or more discontinuities are detected in the condition signals. The discontinuities in the condition signals are compensated for (e.g., by applying a shifting factor to models of the signals) and trends of the compensated condition signals are determined. The trends are used to predict future fault conditions in machines.

In some embodiments, Kalman filters comprising observation models and evolution models are used to determine the trends. Discontinuity in observed signals is detected using hypothesis testing. A probability of a discontinuity in the condition signal and conditional probability of the actual condition signal given the observed condition signal is determined. Shifting factors and conditional probabilities of the actual signal given the received condition signal and the shifting factors are iteratively determined until a maximum of the conditional probabilities of the actual signal given the received condition signal and the shifting factors is achieved. A first discontinuity evaluation is calculated by multiplying the probability of no discontinuity in the condition signal with the conditional probability of the actual condition signal given the received condition signal. Similarly, a second discontinuity evaluation is calculated by multiplying the probability of a discontinuity in the condition signal with the conditional probability of the actual condition signal given the received condition signal. Finally, a discontinuity in the condition signal is indicated only if the second discontinuity evaluation is greater than the first discontinuity evaluation.

These and other advantages of the invention will be apparent to those of ordinary skill in the art by reference to the following detailed description and the accompanying drawings.

DETAILED DESCRIPTION

The present invention generally provides methods and apparatus for accurately predicting faults in machine condition monitoring using discontinuity detection. Though discussed herein as a method of machine condition monitoring and trend analysis of condition signals therefore, one of skill in the art will recognize that the herein described discontinuity detection in trend analysis is not limited to machine condition monitoring and may be extended to any appropriate system requiring discontinuity detection in signals. Thus, the present invention may be applied in any appropriate forecasting methods or algorithms, such as weather forecasting, social and/or behavioral patterns, architecture, etc.

Figure 1:
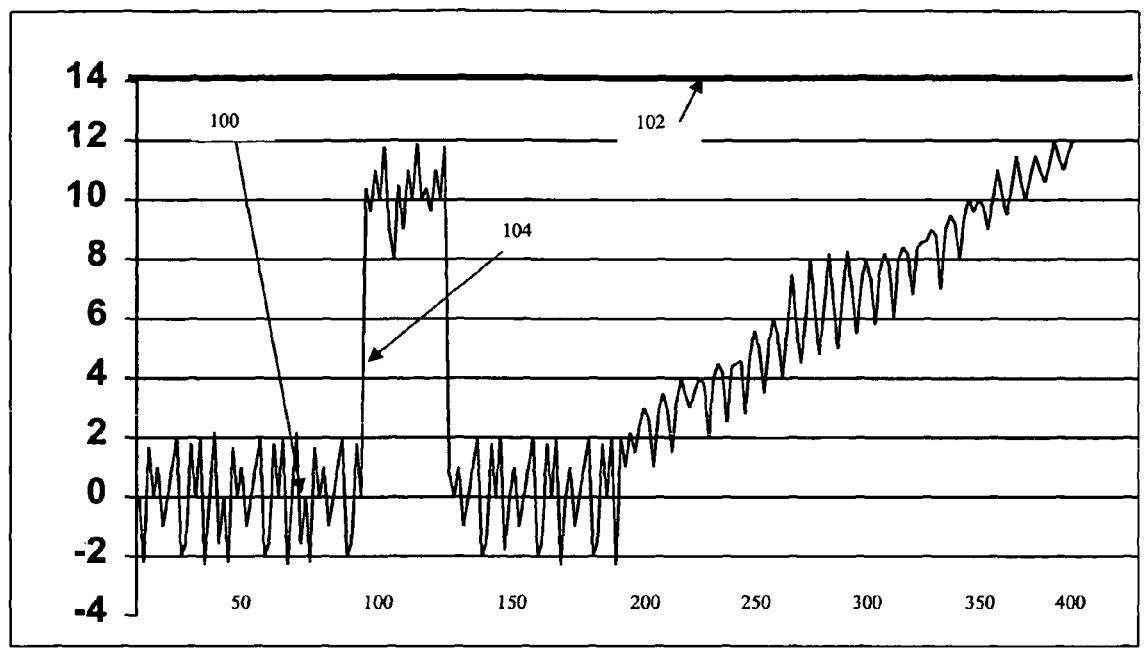
FIG. 1 depicts a graph of a condition signal.
Figure 2:
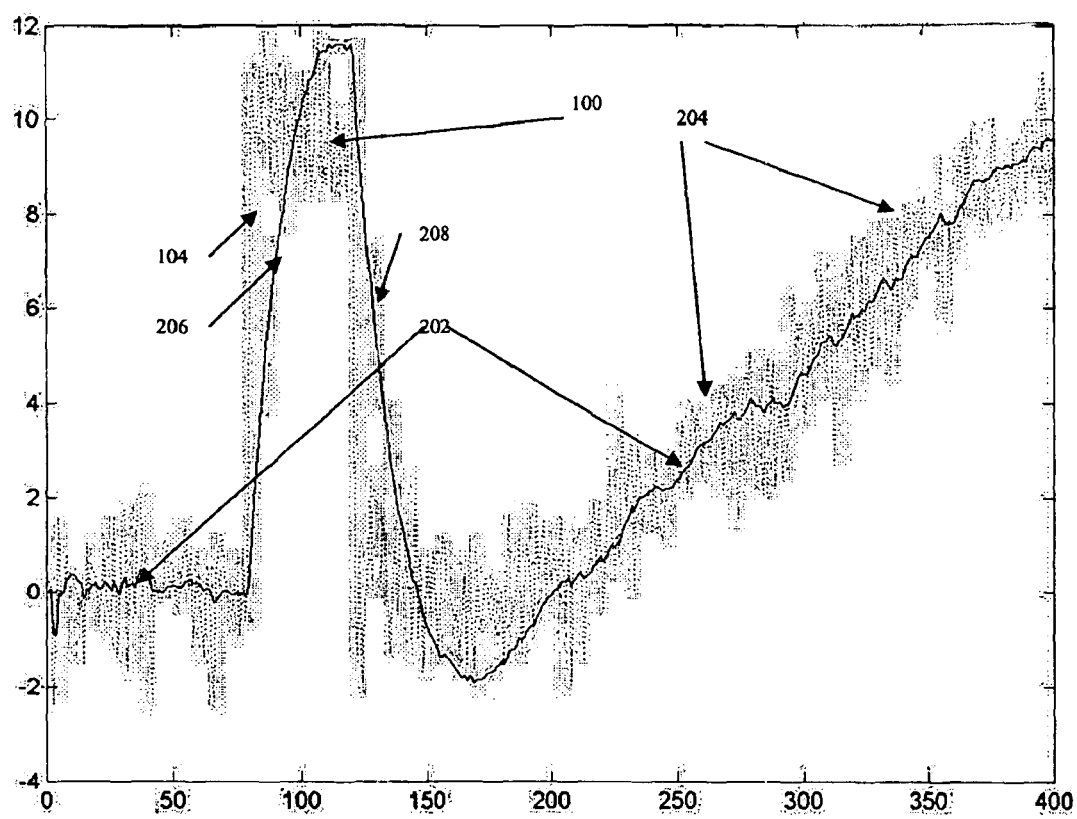
FIG. 2 depicts a graph of a condition signal and a prior art trend analysis curve.
Figure 3:
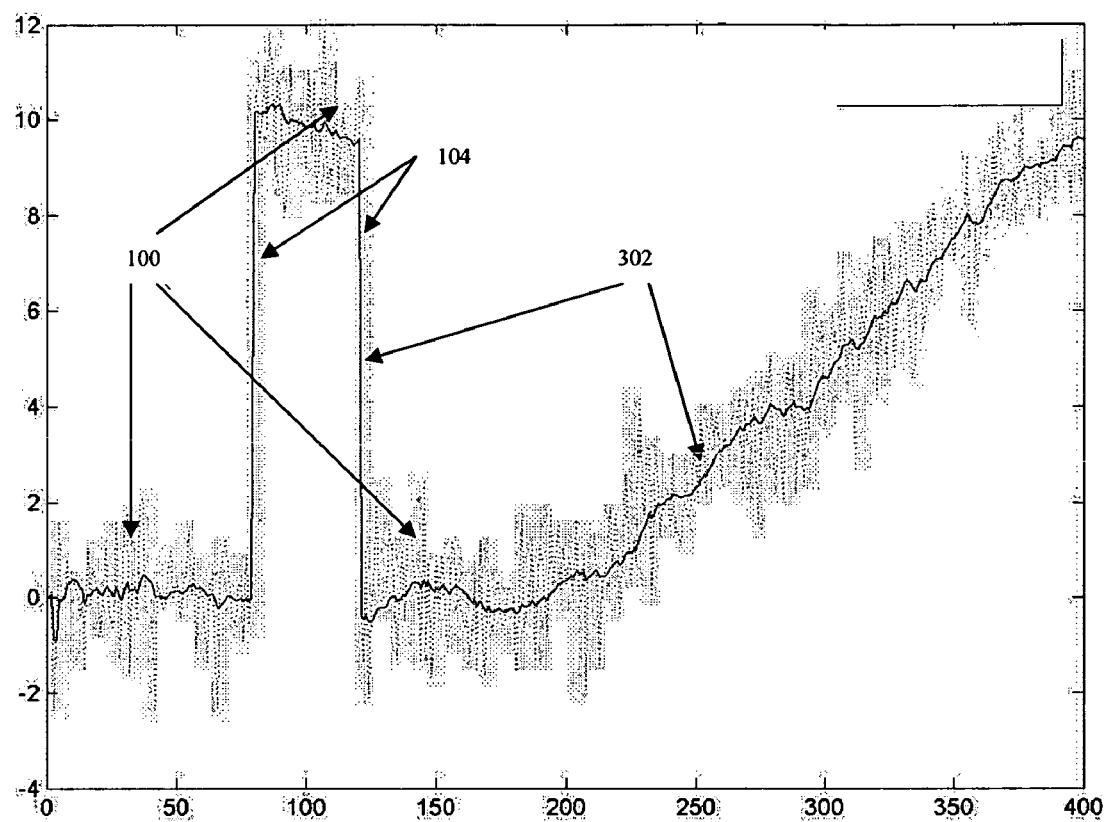
FIG. 3 depicts a graph of a condition signal and a trend analysis curve according to an embodiment of the present invention.

FIGS. 1-3 depict signals (e.g. condition signals, machine condition signals, etc.) used in machine condition monitoring. These signals may be representative of machine parameter values acquired by one or more sensors of a machine. Though represented as graphs of signals, it is understood that the graphs are representative of the actual acquired (e.g., measured, etc.) signals to be analyzed. For purposes of illustration of an embodiment of the present invention, the same signal is depicted in FIGS. 1-3. FIG. 1 provides an overview of the condition signal 100 and certain features related to it; FIG. 2 shows a prior art method of trend analysis; FIG. 3 depicts trend analysis according to an embodiment of the present invention.

FIG. 1 depicts a graph of a condition signal 100. Condition signal 100 may be a condition signal indicative of current machine conditions. For example, condition signal 100 may be temperature measurements for a particular machine. In MCM, that machine may be subject to a threshold rule, such as: "If temperature>14, then temperature fault." That is, when the measured temperature exceeds a threshold 102 (e.g., exceeds 14), a fault condition is reached. This may indicate failure of the machine, required maintenance, or the like. As discussed above, it is desirable to predict when the input of the rule is true and a fault is output (e.g., when the condition signal 100 crosses threshold 102).

Condition signal 100 may have one or more discontinuities 104 (e.g., shifts). In the example of FIGS. 1-3, condition signal 100 has a discontinuity 104 of approximately magnitude 10 approximately between the 80th and 120th parameter values (e.g., at times (t) 80 and 100). However, since condition signal 100 did not reach threshold 102 (e.g., did not exceed 14), no alarms, faults, or fault conditions should be given and/or indicated. As discussed herein, "discontinuities" or shifts are similar to, but distinct from, jump-type discontinuities in mathematics. Condition signal 100 is a continuous signal with distinct parameter values at each time t. In the context of the present invention, discontinuities are rapid and dramatic shifts of the parameter values of the condition signal that, when modeled, result in significant changes to the equation of the estimate of the condition signal that reveal as false trends. In other words, any condition signal varying more rapidly than what the evolution model describes can be viewed as having a discontinuity.

FIG. 2 depicts a conventionally analyzed graph of condition signal 100. That is, the graph of condition signal 100 as shown in FIG. 1 is superimposed with a prior art trend analysis curve 202. By determining an equation for or otherwise modeling trend analysis curve 202, a prediction may be made as to when the measured temperature will exceed threshold 102.

Beginning at approximately the 200$^{th}$ parameter value, condition signal 100 exhibits a substantially linear trend 204 tending upward toward threshold 102 (not shown in FIG. 2). However, since the discontinuity 104 does not cause condition signal 100 to exceed threshold 102 (e.g., discontinuity 104 is an unexplained, but inconsequential spike in temperature), trend analysis should not show a trend between approximately the 80$^{th}$ and 120$^{th}$ parameter values. Rather, the trend analysis curve 202 should only show trend 204 after approximately the 200$^{th}$ parameter value.

Conventional trend analysis fits polynomial curves to the incoming signal (e.g., condition signal 100) to determine a trend analysis curve 202. Kalman filters have been widely used in such trend analysis. As is known, Kalman filters are recursive filters that estimate the state of a dynamic system from a series of incomplete and/or noisy measurements. These Kalman filters have an observation model and an evolution model. The observation model can be described by $y_t = x_t + u_t$, where $y_t$ is the observed condition signal 100, $x_t$ (e.g., trend analysis curve 202) is the actual signal (e.g., actual signal component of observed condition signal 100) or an estimate of actual signal (e.g., the signal indicative of the "real" or "perfect" parameter values), and $u_t$ is a Gaussian noise component of condition signal 100. The evolution model can then be described as $$\begin{bmatrix} x_t \\ v_t \end{bmatrix} = \begin{bmatrix} 1 & \Delta t \\ 0 & 1 \end{bmatrix} \begin{bmatrix} x_{t-1} \\ v_{t-1} \end{bmatrix} + w_t$$

where $v_t$ is a first order derivative (e.g., velocity) of $x_t$, $\Delta t$ is a time resolution, and $w_t$ is a Gaussian noise vector to compensate for any uncertainty (e.g., error) of the evolution model.

In operation, the parameters of both $u_t$ and $w_t$ may be preset (e.g., by a user) and/or learned from training data. The evolution model describes how current actual signal $x_t$ and current derivative $v_t$ are related to their last time interval values $x_{t-1}$ and $v_{t-1}$. Of course, higher order derivatives of $x_t$ may be included in the evolution model, which represent the second order derivative of $x_t$ (e.g., acceleration), the third order derivative of $x_t$ (e.g., jerk), etc. Higher order derivatives are not included herein for illustration simplicity.

Using the observation model and the evolution model, the Kalman filter infers $x_t$ and $v_t$ from all historical observation points $y_1, y_2, \ldots, y_t$. Once the estimates of x and v at time t are available, the value of x may be predicted at some future time. For example, the predicted value of x at future time $t+\Delta t$ is simply $x_t + \Delta t \cdot v_t$.

The current $x_t$ is approximated by its first order Taylor series: $x_t = x_{t-1} + \Delta t \cdot v_{t-1} +$ an error term. The current $v_t$ is approximated by its zero-order Taylor series: $v_t = v_{t-1} +$ an error term. The success of Kalman filters rely on how accurate the evolution model fits the parameter values (e.g., as in signal 100) and, in particular, how accurate the approximation of the Taylor series is. However, in some cases, where there is discontinuity of $x_t$, the evolution model described above is no longer a good approximation of $x_t$ and special treatment is needed as described below with respect to method 400 and FIGS. 3 and 4.

The conventional Kalman filter as described herein produces the trend analysis curve 202 (e.g., an estimate of $x_t$) as shown in FIG. 2. Trend analysis curve 202 shows the linear trend 204 after approximately the 200$^{th}$ parameter value. However, trend analysis curve 202 mistakenly shows two trends 206 and 208 around approximately the 80$^{th}$ data point and approximately the 120$^{th}$ data point, respectively, which consequently leads to a false alarm, an improper trigger of a rule, an incorrect fault, etc. That is, if a prediction of a fault is made using trend analysis curve 202, the trend 206 will lead to the incorrect conclusion that a fault will occur at approximately the 120$^{th}$ parameter value (e.g., time record, etc.).

FIG. 3 depicts a graph of condition signal 100 and improved trend analysis curve 302. That is, the graph of condition signal 100 as shown in FIGS. 1 and 2 is superimposed with a trend analysis curve 302 determined according to the method described below with respect to FIG. 4. Similar to the trend analysis curve 202 described above with respect to FIG. 2, by determining an equation for or otherwise modeling trend analysis curve 302, a prediction may be made as to when the measured temperature will exceed threshold 102. However, the improved trend analysis curve 302 predicts and accounts for shift 104 without erroneous trends 206 and 208 of FIG. 2. Trend analysis curve 302 improves upon prior trend analysis curve 202 because trend analysis curve 302 will not produce a false positive (e.g., false trend 206) and consequent fault prediction (e.g., threshold 102 crossing).

Figure 4:
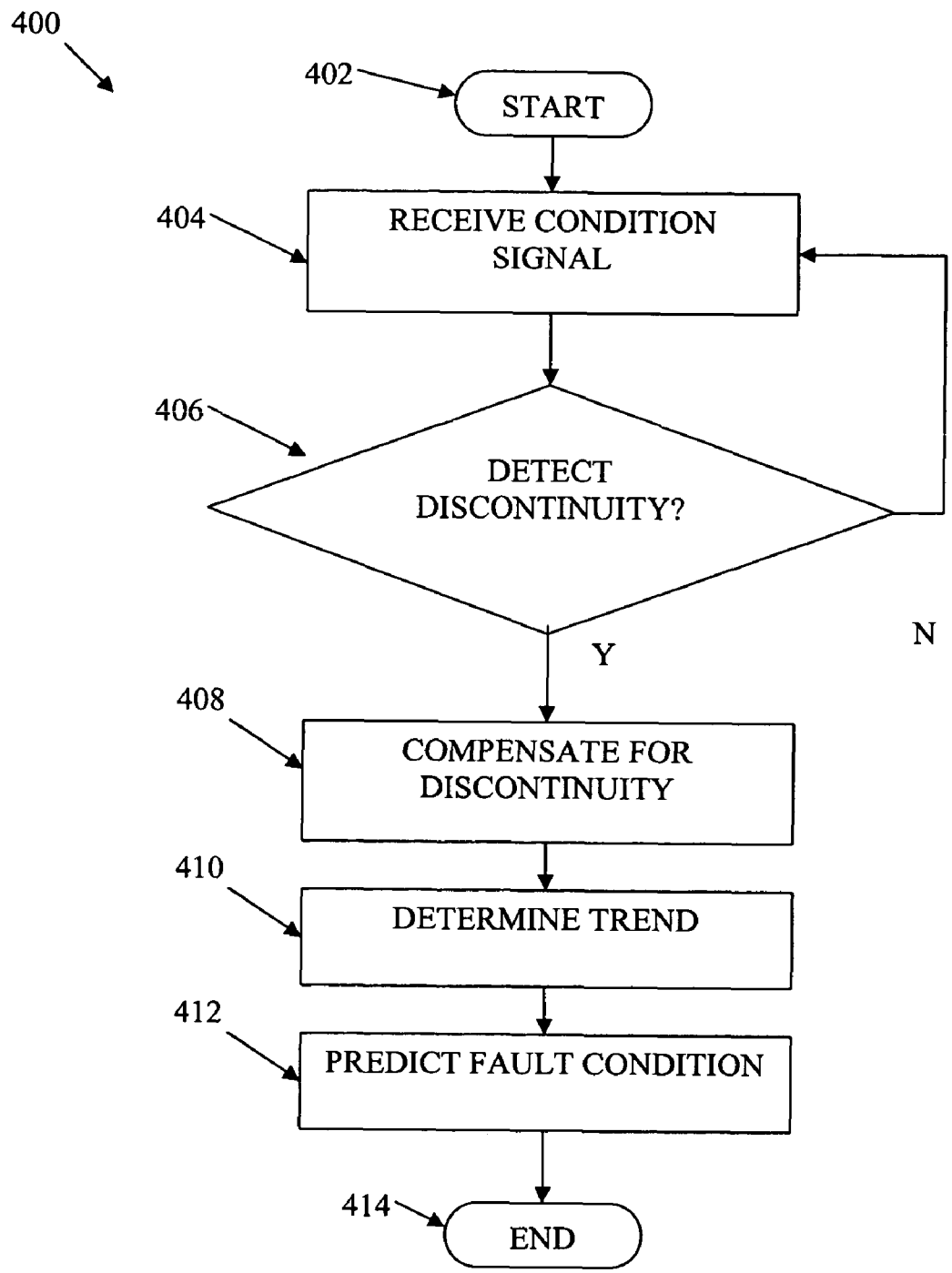
FIG. 4 is a flowchart of a method of machine condition monitoring according to an embodiment of the present invention.

FIG. 4 is a flowchart of a method 400 of machine condition monitoring. In at least one embodiment, method steps of method 400 may be used to predict and/or detect fault conditions. An MCM computer, such as the computer 600 described below with respect to FIG. 6, may be used to predict and/or detect faults in machines. As discussed above, method 400 may be applied broadly to any system requiring trend analysis, though it is described below with respect to MCM and FIGS. 1-3 for hermeneutical simplicity. The method begins at step 402.

In step 404, a condition signal (e.g., condition signal 100) is received. The condition signal may be one or more parameter values received from one or more sensors at a machine. That is, the condition signal may be an actual observed signal as described above with respect to FIGS. 1-3.

In step 406, a test is performed to determine if a discontinuity 104 is detected in the condition signal 100. The existence of a discontinuity 104 may be determined by performing hypothesis testing at each time interval.

Generally, a binary variable $s_t$ denotes the event of a discontinuity at time t. If $s_t=1$, the discontinuity event occurs; if $s_t=0$, the discontinuity event does not occur. The probability for such discontinuity event occurring is $P(s_t=1)=p$. The probability p of a discontinuity event may be entered by a user, may be determined using historical data, may be determined using training data, may be approximated, and/or may be determined by any other appropriate method. In at least one embodiment, the discontinuity event probability p is set to 0.01, indicating that a discontinuity event is unlikely to happen. Other appropriate probabilities p may be determined and/or used.

For hypothesis testing in step 406, $H_0$ indicates a discontinuity event does not occur at time t. $H_0$ may be determined using an evaluation function. The evaluation function for $H_0$ is $P(s_t=0) \cdot P(y_t|x_t)$ where $P(s_t=0)=(1-p)$ and $P(y_t|x_t)$ is the conditional probability of $y_t$ given the estimate $x_t$ from the Kalman filter described above. Conditional probability $P(y_t|x_t)$ may be computed from the observation model described above and indicates how well the original Kalman filter fits the data (e.g., the condition signal 100).

$H_1$ indicates a discontinuity event does occur at time t. The evaluation function for $H_1$ is $P(s_t=1) \cdot P(y_t|x_t, m_t)$ where $m_t$ is a shifting factor (e.g., a factor that shifts a portion of the trend analysis curve 302 such that the discontinuity 104 is accounted for). With shifting factor $m_t$, the original evolution equation for original signal $x_t$ becomes $x_t=x_{t-1}+m_t+\Delta t \cdot v_t+$an error term. A maximum conditional probability $P(y_t|x_t, m_t)$ may be determined by iteratively determining additional shifting factors and searching for the shifting factor $m_t$ which maximizes $P(y_t|x_t, m_t)$. Since $P(y_t|x_t, m_t)$ is a Gaussian probability density function, maximizing $P(y_t|x_t, m_t)$ is equivalent to minimizing $$\left(\frac{(y_t - x_t - m_t)^2}{2\sigma^2}\right)$$

where $\sigma$ is the preset or learned standard deviation of observation noise. For each possible shifting factor $m_t$, instead of the actual signal from the previous time (e.g., $x_{t-1}$), the actual signal from the previous time and the current shifting factor (e.g., $x_{t-1}+m_t$) may be input into the Kalman filter, described above with respect to FIG. 2, and a new $x_t$ may be computed.

A discontinuity event (e.g., discontinuity 104) is determined to have occurred (e.g., a discontinuity is detected) if $P(s_t=0) P(y_t|x_t) < P(s_t=1) P(y_t|x_t, m_t)$ and the method passes to step 408. If the evaluation function for a discontinuity event occurring (e.g., $H_1$) is not determined to be greater than the evaluation function for a discontinuity event not occurring (e.g., $H_0$), a discontinuity event (e.g., discontinuity 104) is determined to have not occurred and the method 400 returns control to step 404 to continue to receive a condition signal 100 (e.g., to receive further parameter values). It should be noted that even if a high conditional probability $P(y_t|x_t, m_t)$ is realized by adjusting shifting factor $m_t$, due to a small probability of a discontinuity event $P(s_t=1)$, $H_1$ is generally not selected in the above-described hypothesis testing method step 406. This effectively reduces false positives (e.g., improper faults, false alarms, etc.).

In step 408, the discontinuity 104 is compensated for in the evolution model (e.g., in trend analysis curve 302). The discontinuity 104 may be compensated for by inserting a shifting factor into the evolution model. The shifting factor mitigates the effect of the discontinuity 104 on the overall trend. That is, in the example of FIGS. 1-3, a shift is added to account for the leading edge of discontinuity 104 and a shift is subtracted to account for the trailing edge of discontinuity 104 as is shown in FIG. 3. Thus, when the overall trend analysis curve 302 is determined, the discontinuity will be eliminated. As described above, $m_t$ is added to the evolution model: $x_t=x_{t-1}+m_t+\Delta t \cdot v_t$. In other words, a standard Kalman filter has an input of $x_{t-1}$ and outputs $x_t$. In at least one embodiment of the present invention, the Kalman filter is input with $x_{t-1}+m_t$ and outputs $x_t$. Of course, other filters may be used as appropriate. For example, other estimation algorithms to denoise and estimate the true underlying signal may be used. A polynomial curve may be fit to the condition signal within a time window and this fit curve may be applied to predict future signals.

In step 410, a trend is determined. In at least one embodiment, the trend is trend analysis curve 302 of FIG. 3. The trend may be determined using a Kalman filter as described above. That is, discontinuity 104 may be compensated for by adding a shifting factor to the evolution model in step 408 and the Kalman filter may produce a model (e.g., trend analysis curve 302) of condition signal 100.

In some embodiments, the trend analysis curve 302 may be used to predict one or more fault conditions in step 412. In other words, one or more future fault conditions may be calculated using trend analysis curve 302. In at least one embodiment, the fault condition is indicative of a parameter value (e.g., a part of condition signal 100) exceeding a threshold (e.g., threshold 102). The fault condition may be predicted at a specific time or range of times based at least in part on the trend of the compensated condition signal determined in step 410. In alternative embodiments, the trend analysis curve 302 may be output to a user (e.g., via I/O devices 610, described below with respect to FIG. 6) and the user may predict a future fault.

The method ends at step 414.

Figure 5:
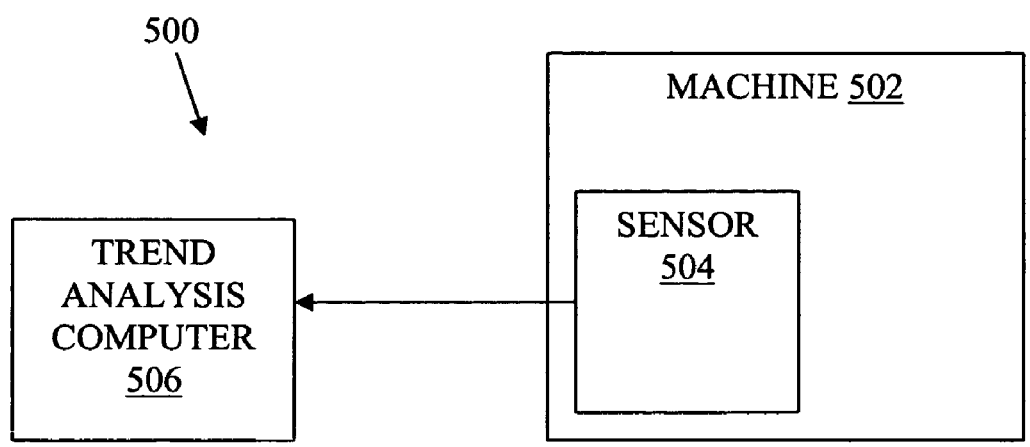
FIG. 5 is a diagram of a machine condition monitoring system according to an embodiment of the present invention.

FIG. 5 depicts a machine condition monitoring system 500 according to an embodiment of the present invention. Machine condition monitoring (MCM) system 500 may be used in both trend analysis, as described above with respect to method 400 of FIG. 4 and FIG. 3, and general machine condition monitoring. MCM system 500 monitors one or more machines 502, each having one or more sensors 504. The output of sensors 504 is received at a trend analysis computer 506, which analyzes trends in signals (e.g., condition signal 100, etc.) output from sensors 104 as described above with respect to FIGS. 3 and 4.

Machines 502 may be any devices or systems that have one or more monitorable machine parameters, which may be monitored by sensors 504. Exemplary machines 502 include rotating and stationary machines, such as turbines, boilers, heat exchangers, etc.

Sensors 504 are any devices that measure quantities and convert the quantities into signals that can be read by an observer and/or by an instrument as is known. Sensors 504 may measure machine parameters of machines 502 such as vibrations, temperatures, friction, electrical usage, power consumption, sound, etc. The output of sensors 504 may be in the form of and/or aggregated into a condition signal (e.g., condition signal 100) as depicted in FIGS. 1-3.

In some embodiments, trend analysis computer 506 may be implemented on and/or in conjunction with one or more computers, such as computer 600 described below with respect to FIG. 6.

Figure 6:
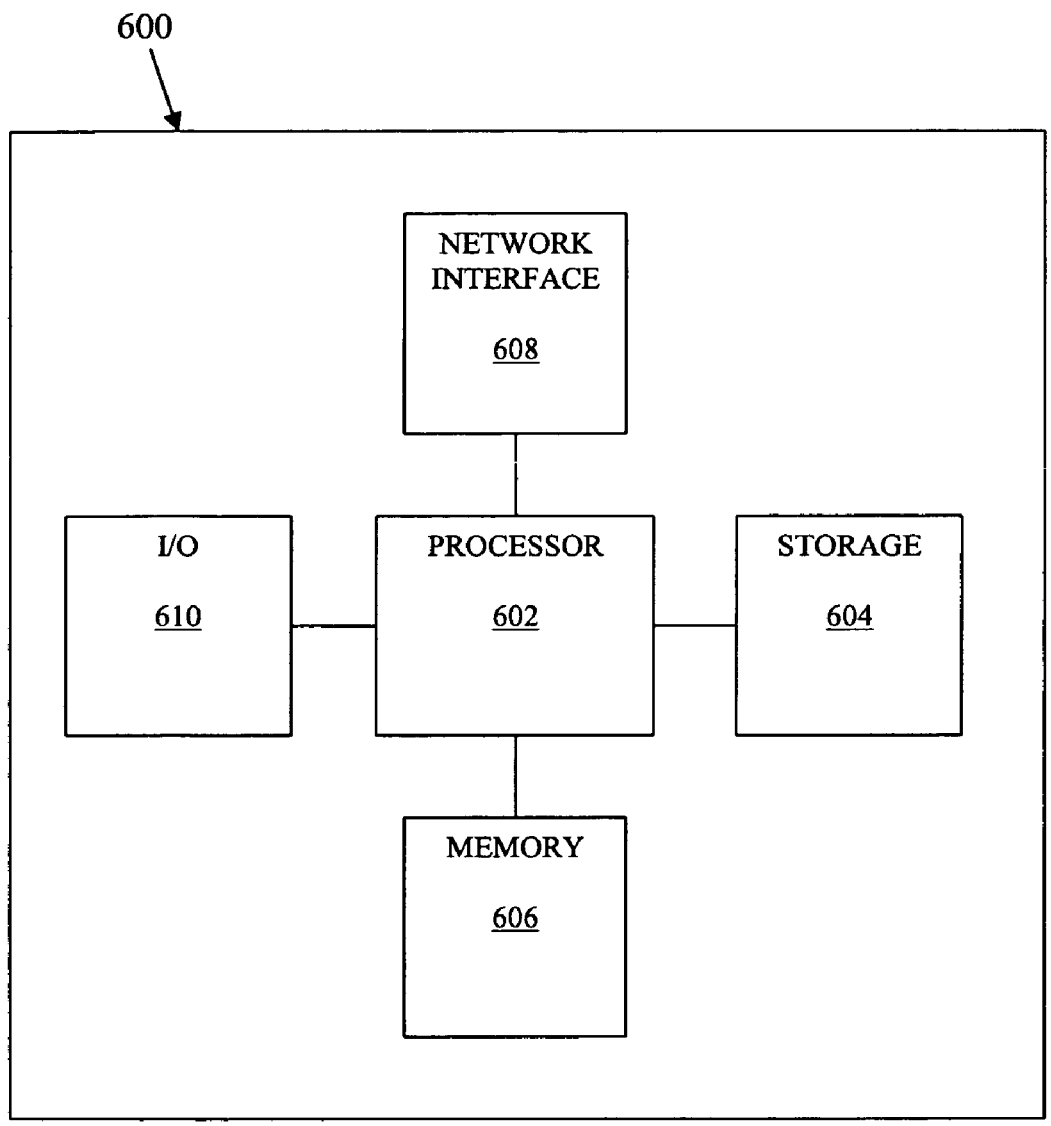
FIG. 6 is a schematic drawing of a computer.

FIG. 6 is a schematic drawing of a computer 600 according to an embodiment of the invention. Computer 600 may perform method steps of method 400.

Computer 600 contains a processor 602 that controls the overall operation of the computer 600 by executing computer program instructions, which define such operation. The computer program instructions may be stored in a storage device 604 (e.g., magnetic disk, database, etc.) and loaded into memory 606 when execution of the computer program instructions is desired. Thus, applications for performing the herein-described method steps, such as discontinuity detection, fault detection, and machine condition monitoring, in method 400 are defined by the computer program instructions stored in the memory 606 and/or storage 604 and controlled by the processor 602 executing the computer program instructions. The computer 600 may also include one or more network interfaces 608 for communicating with other devices via a network. The computer 600 also includes input/output devices 610 (e.g., display, keyboard, mouse, speakers, buttons, etc.) that enable user interaction with the computer 600. Computer 600 and/or processor 602 may include one or more central processing units, read only memory (ROM) devices and/or random access memory (RAM) devices. One skilled in the art will recognize that an implementation of an actual controller could contain other components as well, and that the controller of FIG. 6 is a high level representation of some of the components of such a controller for illustrative purposes.

According to some embodiments of the present invention, instructions of a program (e.g., controller software) may be read into memory 606, such as from a ROM device to a RAM device or from a LAN adapter to a RAM device. Execution of sequences of the instructions in the program may cause the computer 600 to perform one or more of the method steps described herein, such as those described above with respect to method 400. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 606 may store the software for the computer 600, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of machine condition monitoring comprising:
   receiving, at a computer, a condition signal, wherein the condition signal comprises an actual condition signal and a noise component;
   detecting, by the computer, a discontinuity in the condition signal;
   compensating, by the computer, for the discontinuity in the condition signal; and
   determining, by the computer, a trend of the compensated condition signal,
   wherein detecting a discontinuity in the condition signal comprises:
   (a) determining a probability of a discontinuity in the condition signal;
   (b) determining a conditional probability of the actual condition signal given the received condition signal;
   (c) determining a shifting factor;
   (d) determining a conditional probability of the actual condition signal given the received condition signal and the shifting factor of (c);
   (e) iteratively repeating (c) and (d);
   (f) selecting a maximum of the conditional probabilities of the actual condition signal given the received condition signal and the shifting factors;
   (g) determining a first discontinuity evaluation by multiplying the probability of no discontinuity in the condition signal with the conditional probability of the actual condition signal given the received condition signal;
   (h) determining a second discontinuity evaluation by multiplying the probability of a discontinuity in the condition signal with the conditional probability of the actual condition signal given the received condition signal; and
   (i) indicating a discontinuity in the condition signal only if the second discontinuity evaluation is greater than the first discontinuity evaluation.

2. The method of claim 1 further comprising:
   determining the actual condition signal with a Kalman filter.

3. The method of claim 2 wherein the Kalman filter comprises an observation model of the condition signal and an evolution model of the condition signal and compensating for the discontinuity in the condition signal comprises:
applying a shifting factor to the evolution model of the condition signal.

4. The method of claim 1 wherein compensating for the discontinuity in the condition signal comprises:
applying the shifting factor corresponding to the maximum of the conditional probabilities of the actual condition signal given the received condition signal and the shifting factors to an evolution model of the condition signal.

5. The method of claim 1 further comprising:
predicting a fault condition based at least in part on the determined trend of the compensated condition signal.

6. A method of trend analysis comprising:
receiving, at a computer, an observed signal;
detecting, by the computer, a discontinuity in the observed signal; and
compensating, by the computer, for the discontinuity in the observed signal by shifting a portion of a trend analysis curve,
wherein detecting a discontinuity in the condition signal comprises:
(a) determining a probability of a discontinuity in the observed signal;
(b) determining a conditional probability of an actual signal given the observed signal;
(c) determining a shifting factor;
(d) determining a conditional probability of the actual signal given the observed signal and the shifting factor of (c);
(e) iteratively repeating (c) and (d);
(f) selecting a maximum of the conditional probabilities of the actual signal given the observed signal and the shifting factors;
(g) determining a first discontinuity evaluation by multiplying the probability of no discontinuity in the actual signal with the conditional probability of the actual signal given the observed signal;
(h) determining a second discontinuity evaluation by multiplying the probability of a discontinuity in the actual signal with the conditional probability of the actual signal given the observed signal; and
(i) indicating a discontinuity in the condition signal only if the second discontinuity evaluation is greater than the first discontinuity evaluation.

7. The method of claim 6 further comprising:
estimating the actual signal based on the observed signal using a Kalman filter.

8. An apparatus for machine condition monitoring comprising:
means for receiving a condition signal;
means for detecting a discontinuity in the condition signal;
means for compensating for the discontinuity in the condition signal; and
means for determining a trend of the compensated condition signal,
wherein the means for detecting a discontinuity in the condition signal comprises:
(a) means for determining a probability of a discontinuity in the condition signal;
(b) means for determining a conditional probability of an actual condition signal given the received condition signal;
(c) means for determining a shifting factor;
(d) means for determining a conditional probability of the actual condition signal given a received condition signal and a shifting factor;
(e) means for selecting a maximum conditional probability of the actual condition signal given a received condition signal and a shifting factor;
(f) means for determining a first discontinuity evaluation by multiplying the probability of no discontinuity in the condition signal with the conditional probability of the actual condition signal given the received condition signal;
(g) means for determining a second discontinuity evaluation by multiplying the probability of a discontinuity in the condition signal with the conditional probability of the actual condition signal given the received condition signal; and
(h) means for indicating a discontinuity in the condition signal only if the second discontinuity evaluation is greater than the first discontinuity evaluation.

9. The apparatus of claim 8 further comprising:
a Kalman filter configured to determine the actual condition signal.

10. The apparatus of claim 9 wherein the Kalman filter has an observation model of the condition signal and an evolution model of the condition signal and the means for compensating for the discontinuity in the condition signal comprises:
means for applying a shifting factor to the evolution model of the condition signal.

11. The apparatus of claim 8 wherein the means for compensating for the discontinuity in the condition signal comprises:
means for applying the shifting factor corresponding to the maximum conditional probability of the actual signal given a received condition signal and a shifting factor to an evolution model of the condition signal.

12. The apparatus of claim 8 further comprising:
means for predicting a fault condition based at least in part on the determined trend of the compensated condition signal.

13. A non-transitory computer readable medium having program instructions stored thereon, the instructions capable of execution by a processor and defining the steps of:
receiving a condition signal;
detecting a discontinuity in the condition signal;
compensating for the discontinuity in the condition signal; and
determining a trend of the compensated condition signal,
wherein the instructions for detecting a discontinuity in the condition signal further define the steps of:
(a) determining a probability of a discontinuity in the condition signal;
(b) determining a conditional probability of an actual condition signal given the received condition signal;
(c) determining a shifting factor;
(d) determining a conditional probability of the actual condition signal given the received condition signal and the shifting factor of (c);
(e) iteratively repeating (c) and (d);
(f) selecting a maximum of the conditional probabilities of the actual condition signal given the received condition signal and the shifting factors;
(g) determining a first discontinuity evaluation by multiplying the probability of no discontinuity in the condition signal with the conditional probability of the actual condition signal given the received condition signal;
(h) determining a second discontinuity evaluation by multiplying the probability of a discontinuity in the condition signal with the conditional probability of the actual condition signal given the received condition signal; and (i) indicating a discontinuity in the condition signal only if the second discontinuity evaluation is greater than the first discontinuity evaluation.

14. The non-transitory computer readable medium of claim 13 wherein the instructions further define the step of:

determining the actual condition signal with a Kalman filter.

15. The non-transitory computer readable medium of claim 14 wherein the Kalman filter comprises an observation model of the condition signal and an evolution model of the condition signal and the instructions for compensating for the discontinuity in the condition signal further define the step of:

applying a shifting factor to the evolution model of the condition signal.

16. The non-transitory computer readable medium of claim 13 wherein the instructions for compensating for the discontinuity in the condition signal further define the step of:

applying the shifting factor corresponding to the maximum of the conditional probabilities of the actual signal given the received condition signal and the shifting factors to an evolution model of the condition signal.

17. The non-transitory computer readable medium of claim 13 wherein the instructions further define the step of:

predicting a fault condition based at least in part on the determined trend of the compensated condition signal.

\* \* \* \* \*